US010363924B2

(12) United States Patent
Yamauchi et al.

(10) Patent No.: US 10,363,924 B2
(45) Date of Patent: Jul. 30, 2019

(54) CONTROL DEVICE AND CONTROL METHOD FOR VEHICLE

(71) Applicant: TOYOTA JIDOSHA KABUSHIKI KAISHA, Toyota-shi, Aichi-ken (JP)

(72) Inventors: Tomokazu Yamauchi, Okazaki (JP); Koichi Nakae, Susono (JP); Ryouji Hironaka, Gamagoori (JP); Kazunobu Eritate, Miyoshi (JP); Takeshi Nozaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 167 days.

(21) Appl. No.: 15/427,564

(22) Filed: Feb. 8, 2017

(65) Prior Publication Data
US 2017/0232957 A1    Aug. 17, 2017

(30) Foreign Application Priority Data

Feb. 12, 2016  (JP) ................................ 2016-024658

(51) Int. Cl.
*B60K 6/387* (2007.10)
*B60W 20/40* (2016.01)
(Continued)

(52) U.S. Cl.
CPC ............. *B60W 20/40* (2013.01); *B60K 6/387* (2013.01); *B60K 6/48* (2013.01); *B60W 10/02* (2013.01);
(Continued)

(58) Field of Classification Search
CPC .. B60K 6/387; B60K 6/48; B60K 2006/4825; B60W 10/02; B60W 20/00; B60W 20/40; B60W 30/08; B60W 30/085; B60W 2030/082; B60W 2510/0638; B60W 2510/081; B60W 2510/1015; B60W 2710/021; B60Y 2200/92; B60Y 2300/097; B60Y 2300/188; B60Y 2300/42; Y02T 10/6221; Y02T 10/6252; Y10S 903/914; Y10S 903/946
See application file for complete search history.

(56) References Cited

U.S. PATENT DOCUMENTS

| 9,333,966 | B2 * | 5/2016 | Matsudaira | ........... B60W 20/00 |
| 2010/0235029 | A1 | 9/2010 | Becker et al. | |
| 2014/0330465 | A1 * | 11/2014 | Matsudaira | ........... B60W 20/00 |
| | | | | 701/22 |

FOREIGN PATENT DOCUMENTS

| JP | 2010242967 A | * 10/2010 | ............. B60K 6/365 |
| JP | 2014-113878 A | 6/2014 | |

* cited by examiner

*Primary Examiner* — Jerrah Edwards
(74) *Attorney, Agent, or Firm* — Sughrue Mion, PLLC (57) ABSTRACT

A vehicle includes an engine, an automatic transmission, a second clutch for engine disconnection, a rotating electric machine, a first clutch for rotating electric machine separation, and an electronic control unit. The electronic control unit switches the first clutch from a release state to an engagement state in a case where a collision of the vehicle occurs, the first clutch is in the release state, and a rotation speed of the rotating electric machine is higher than an input shaft rotation speed of the automatic transmission. In a case where the collision of the vehicle occurs, the first clutch is in the release state, and the rotation speed of the rotating electric machine is lower than the input shaft rotation speed of the automatic transmission, the first clutch is maintained in the release state.

4 Claims, 7 Drawing Sheets

(51) Int. Cl.
*B60W 30/08* (2012.01)
*B60K 6/48* (2007.10)
*B60W 10/02* (2006.01)
*B60W 20/00* (2016.01)
*B60W 30/085* (2012.01)

(52) U.S. Cl.
CPC ............ *B60W 20/00* (2013.01); *B60W 30/08* (2013.01); *B60W 30/085* (2013.01); *B60K 2006/4825* (2013.01); *B60W 2030/082* (2013.01); *B60W 2510/0638* (2013.01); *B60W 2510/081* (2013.01); *B60W 2510/1015* (2013.01); *B60W 2710/021* (2013.01); *B60Y 2200/92* (2013.01); *B60Y 2300/097* (2013.01); *B60Y 2300/188* (2013.01); *B60Y 2300/42* (2013.01); *Y02T 10/6221* (2013.01); *Y02T 10/6252* (2013.01); *Y10S 903/914* (2013.01); *Y10S 903/946* (2013.01)

CONTROL DEVICE AND CONTROL METHOD FOR VEHICLE

INCORPORATION BY REFERENCE

The disclosure of Japanese Patent Application No. 2016-024658 filed on Feb. 12, 2016 including the specification, drawings and abstract is incorporated herein by reference in its entirety.

BACKGROUND

1. Technical Field

The present disclosure relates to a control device and a control method for a hybrid vehicle including an automatic transmission.

2. Description of Related Art

A vehicle which travels using power of at least one of an engine and a rotating electric machine, a so-called hybrid vehicle, normally includes a high-voltage battery which stores electric power for driving the rotating electric machine, and an electric power conversion device which performs electric power conversion between the battery and the rotating electric machine. Inside the electric power conversion device, in general, a capacitor for stabilizing a voltage is provided. Since the capacitance of the capacitor is large, in a case where the vehicle collides against a collision object, such as other vehicles or obstacles, it is desirable to quickly discharge the residual electric charge of the capacitor in order to prevent the residual electric charge of the capacitor from leaking and affecting other devices.

Of the hybrid vehicles, there is a hybrid vehicle in which an automatic transmission is provided between a rotating electric machine and drive wheels. In a hybrid vehicle including an automatic transmission, if down-shift control, that is, control for increasing the ratio (the gear ratio of the automatic transmission) of an input shaft rotation speed to an output shaft rotation speed is performed at the time of a collision of the vehicle, there occurs a problem in that discharging cannot be made quickly. That is, if the down-shift control is performed at the time of the collision of the vehicle, the rotation speed of the rotating electric machine increases with an increase in the rotation speed of the input shaft of the automatic transmission. If the rotation speed of the rotating electric machine increases, since the time until the rotating electric machine is stopped is extended, and a counter electromotive force of the rotating electric machine continues to be supplied to a capacitor over a long period of time, the time required for discharging the residual electric charge of the capacitor is extended.

As a measure for the above-described problem, Japanese Patent Application Publication No. 2014-113878 (JP 2014-113878 A) discloses a technique which, in a hybrid vehicle including an automatic transmission, inhibits down-shift control in a case where a collision of the vehicle is detected. According to this technique, after the collision of the vehicle, an increase in the rotation speed of the rotating electric machine due to the down-shift control is suppressed. For this reason, the extension of the time required for discharging the residual electric charge of the capacitor is suppressed.

SUMMARY

However, the technique disclosed in JP 2014-113878 A described above merely suppresses an increase in the rotation speed of the rotating electric machine after the collision of the vehicle, and cannot early decrease the rotation speed of the rotating electric machine. If the rotating electric machine continues to rotate without early decreasing in rotation speed, the counter electromotive force of the rotating electric machine continues to be supplied to the capacitor. For this reason, in order to more quickly discharge the residual electric charge of the capacitor, there is a need for further improvement to early decrease the rotation of the rotating electric machine.

The disclosure is to early decrease a rotation speed of a rotating electric machine after a collision of a vehicle in a hybrid vehicle including an automatic transmission.

An example aspect of the present disclosure provides a control device for a vehicle, the vehicle including an engine, a rotating electric machine, the vehicle configured to travel using power of at least one of the engine and the rotating electric machine, an automatic transmission including an input shaft connected to the engine and the rotating electric machine, a collision detection sensor configured to detect whether or not a collision of the vehicle occurs, and a first clutch provided between the rotating electric machine and the input shaft, the first clutch being configured to switch a connection state of the rotating electric machine the input shaft between an engagement state and a release state, the control device includes an electronic control unit configured to (i) execute a first engagement switching control, the first engagement switching control being control for switching the first clutch from the release state to the engagement state when the occurrence of the collision of the vehicle is detected by the collision detection sensor, the first clutch is in the release state, and a rotation speed of the rotating electric machine is equal to or higher than a rotation speed of the input shaft, and (ii) execute a release maintenance control, the release maintenance control being control for maintaining the first clutch in the release state when the occurrence of the collision of the vehicle is detected by the collision detection sensor, the first clutch is in the release state, and the rotation speed of the rotating electric machine is lower than the rotation speed of the input shaft. An example aspect of the present disclosure provides a control method for a vehicle, the vehicle including an engine, a rotating electric machine, the vehicle configured to travel using power of at least one of the engine or the rotating electric machine, an automatic transmission including an input shaft connected to the engine and the rotating electric machine, a collision detection sensor configured to detect whether or not a collision of the vehicle occurs, a first clutch provided between the rotating electric machine and the input shaft, the first clutch being configured to switch a connection state of the rotating electric machine and the input shaft between an engagement state and a release state, an electronic control unit, the control method includes (i) executing a first engagement switching control by the electronic control unit, the first engagement switching control being control for switching the first clutch from the release state to the engagement state when the occurrence of the collision of the vehicle is detected by the collision detection sensor, the first clutch is in the release state, and a rotation speed of the rotating electric machine is equal to or higher than a rotation speed of the input shaft, and (ii) executing a release maintenance control by the electronic control unit, the release maintenance control being control for maintaining the first clutch in the release state when the occurrence of the collision of the vehicle is detected by the collision detection sensor, the first clutch is in the release state, and the rotation speed of the rotating electric machine is lower than the rotation speed of the input shaft.

According to the above-described configuration, in a case where the collision of the vehicle occurs and the first clutch is in the release state, the first clutch is engaged only in a case where the rotation speed of the rotating electric machine is equal to or higher than the rotation speed of the input shaft. That is, in a case where the rotation speed of the rotating electric machine is equal to or higher than the rotation speed of the input shaft, the first clutch is switched to the engagement state. (the first engagement switching control) With this, it is possible to early decrease the rotational energy of the rotating electric machine, and to early decrease the rotation speed of the rotating electric machine toward the rotation speed of the input shaft. In a case where the rotation speed of the rotating electric machine is lower than the rotation speed of the input shaft, the first clutch is not engaged and the release state is maintained. (the release maintenance control) With this, an unnecessary increase in the rotation speed of the rotating electric machine toward the rotation speed of the input shaft due to the engagement of the first clutch is suppressed. As a result, in the hybrid vehicle including the automatic transmission, it is possible to early decrease the rotation speed of the rotating electric machine after the collision of the vehicle.

The vehicle may further include a second clutch provided between the engine and the input shaft, the second clutch being configured to switch a connection state of the engine and the input shaft between the engagement state and the release state. The electronic control unit may be configured to (i) bring the second clutch into the engagement state when the rotation speed of the input shaft is equal to or higher than a rotation speed of the engine during the execution of the release maintenance control, and (ii) execute a second engagement switching control, the second engagement switching control being control for switching the first clutch from the release state to the engagement state when the rotation speed of the input shaft decreases to be equal to or lower than the rotation speed of the rotating electric machine after the second clutch is brought into the engagement state.

According to the above-described configuration, even in a case where the first clutch is maintained in the release state by the release maintenance control after the collision of the vehicle, in a case where the rotation speed of the input shaft is equal to or higher than the rotation speed of the engine, the second clutch is brought into the engagement state. With this, it is possible to early decrease the rotation speed of the input shaft toward the rotation speed of the engine. In a case where the rotation speed of the input shaft decreases to be equal to or lower than the rotation speed of the rotating electric machine due to the engagement of the second clutch, the first clutch is switched to the engagement state. (the second engagement switching control) With this, it is possible to early decrease the rotation speed of the rotating electric machine toward the rotation speed of the input shaft.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described in detail referring to the drawings. In the drawings, the same or similar portions are represented by the same reference numerals, and description thereof will not be repeated.

Figure 1:
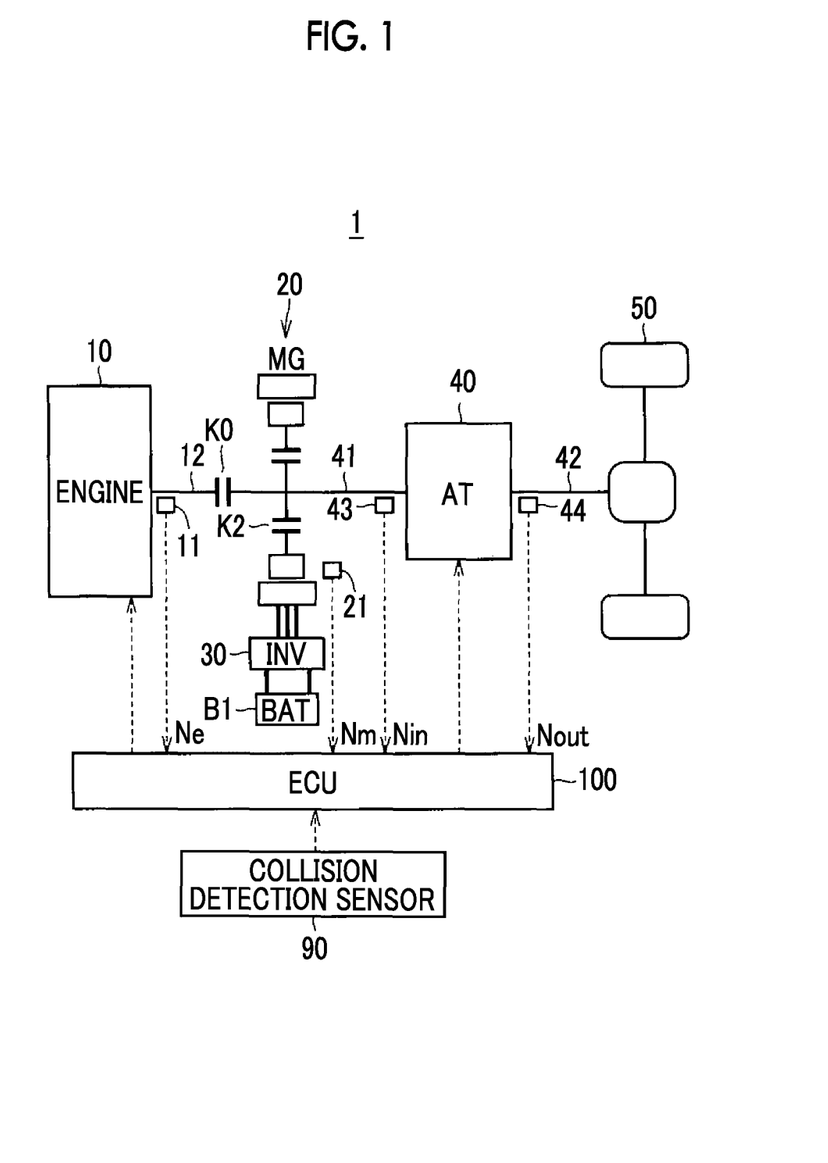
FIG. 1 is an overall configuration diagram of a vehicle.

FIG. 1 is an overall configuration diagram of a vehicle 1 according to this embodiment. The vehicle 1 includes an engine 10, a clutch K0 (second clutch) for engine disconnection, a motor generator (hereinafter, referred to as "MG") 20, a clutch K2 (first clutch) for MG disconnection, an electric power conversion device 30, a battery B1, an automatic transmission (AT) 40, drive wheels 50, a collision detection sensor 90, an electronic control unit (ECU) 100.

The vehicle 1 is a hybrid vehicle which travels using power of at least one of the engine 10 or the MG 20.

The engine 10 is an internal combustion engine, such as a gasoline engine or a diesel engine. A crank shaft 12 of the engine 10 is connected to an input shaft (hereinafter, referred to as "AT input shaft") 41 of the automatic transmission 40 through the clutch K0. A rotor of the MG 20 is connected to the AT input shaft 41 through the clutch K2. An output shaft (hereinafter, referred to as "AT output shaft") 42 of the automatic transmission 40 is connected to the right and left drive wheels 50 through a differential gear.

The MG 20 is a three-phase AC permanent magnet type synchronous motor. The MG 20 is driven with high-voltage electric power supplied from the battery B1 by way of the electric power conversion device 30. The MG 20 is rotated with power transmitted from the engine 10 or the drive wheels 50, that is, power transmitted from the AT input shaft 41 to generate electric power.

The battery B1 stores electric power for driving the MG 20. An output voltage of the battery B1 is a comparatively high voltage (for example, about several hundreds of volts). The electric power conversion device 30 performs electric power conversion between the MG 20 and the battery B1.

The automatic transmission 40 is a stepped automatic transmission which is able to selectively form a plurality of gear stages in which the gear ratio, that is, the ratio of a rotation speed of the AT input shaft 41 to a rotation speed of the AT output shaft 42 is different. A so-called torque converter may be provided on the input side of the automatic transmission 40. In this example, although the stepped automatic transmission has been described, the disclosure includes not only a case of the stepped automatic transmission but also a case of a continuously variable automatic transmission.

The collision detection sensor 90 includes, for example, a G sensor which is an acceleration sensor, and is configured to detect whether or not the vehicle 1 collides against an collision object from a detection result of the G sensor and to output a signal indicating a detection result to the ECU 100.

The vehicle 1 further includes an engine rotation speed sensor 11, a resolver 21, an input shaft rotation speed sensor 43, and an output shaft rotation speed sensor 44. The engine rotation speed sensor 11 detects a rotation speed (hereinafter, referred to as "engine rotation speed") Ne of the engine 10. The resolver 21 detects a rotation speed (hereinafter, referred to as "MG rotation speed") Nm of the MG 20. The input shaft rotation speed sensor 43 detects a rotation speed (hereinafter, referred to as "AT input shaft rotation speed") Nin of the AT input shaft 41. The output shaft rotation speed sensor 44 detects a rotation speed (hereinafter, referred to as "AT output shaft rotation speed") Nout of the AT output shaft 42. The vehicle 1 is also provided with a plurality of sensors (all of these are not shown) for a physical quantity necessary for controlling the vehicle 1, such as accelerator opening which is an accelerator pedal operation amount by a user, a brake depression force which is a brake pedal operation amount by the user, and a vehicle speed. These sensors transmit detection results to the ECU 100.

The ECU 100 includes a central processing unit (CPU) and a memory (not shown). The ECU 100 executes predetermined calculation processing based on information from the respective sensors and information stored in the memory and controls the respective equipment of the vehicle 1 based on a calculation result.

The ECU 100 makes the vehicle 1 travel in any traveling mode among a motor traveling mode, a hybrid traveling mode, an engine traveling mode, and a coasting mode. In the motor traveling mode, the ECU 100 releases the clutch K0 and engages the clutch K2 to make the drive wheels 50 rotate with power of the MG 20. In the hybrid traveling mode, the ECU 100 engages the clutch K0 and engages the clutch K2 to make the drive wheels 50 rotate with power of both of the engine 10 and the MG 20. In the engine traveling mode, the ECU 100 engages the clutch K0 and releases the clutch K2 to make the drive wheels 50 rotate with power of the engine 10. In the coasting mode, the ECU 100 releases the clutch K0 and releases the clutch K2 to make the vehicle 1 travel with inertia as an inertial force of the vehicle 1.

Figure 2:
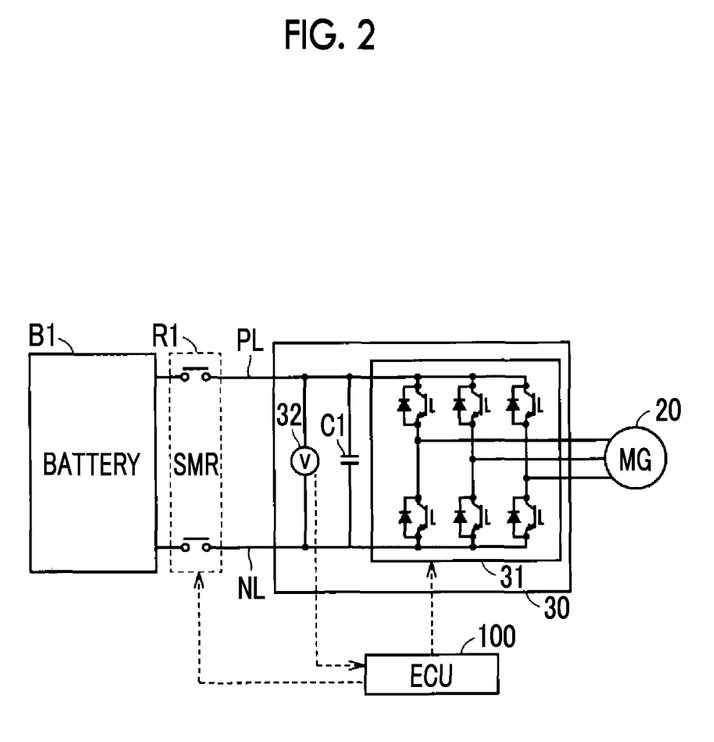
FIG. 2 is a diagram schematically showing an example of the configuration of an electric circuit of the vehicle.

FIG. 2 is a diagram schematically showing an example of the configuration of an electric circuit of the vehicle 1. In the electric circuit of the vehicle 1, the battery B1, a power line PL, a power line NL, a system main relay (SMR) R1, the electric power conversion device 30, and the MG 20 are included.

The system main relay R1 is provided in the power line PL and the power line NL, and is opened or closed in response to a control signal from the ECU 100. If the system main relay R1 is closed, the battery B1 is connected to the electric power conversion device 30. If the system main relay R1 is opened, the battery B1 is disconnected from the electric power conversion device 30.

The electric power conversion device 30 includes an inverter 31, a capacitor C1, and a voltage sensor 32. The inverter 31 is provided between the battery B1 and the MG 20, and performs electric power conversion between the battery B1 and the MG 20 in response to a control signal from the ECU 100. The inverter 31 has the circuit configuration of a so-called three-phase inverter, and includes a U-phase arm, a V-phase arm, and a W-phase arm. Each phase arm includes an upper switching element and a lower switching element connected in series, and a diode connected in reversely parallel with each switching element. An intermediate point of each phase arm is connected to the MG 20.

The capacitor C1 is a large-capacitance and high-voltage smoothing capacitor which is electrically connected between the power line PL and the power line NL. The capacitor C1 smooths an AC component of voltage fluctuation between the power line PL and the power line NL. With this, a voltage between the power line PL and the power line NL is stabilized.

The voltage sensor 32 detects a voltage across the capacitor C1 and outputs a detection result to the ECU 100.

The ECU 100 monitors the MG rotation speed Nm based on the output of the resolver 21 (see FIG. 1), or the like and controls the inverter 31 to control the output (electrical conduction amount) of the MG 20.

As described above, the output voltage of the battery B1 is a high voltage (for example, about several hundreds of volts). In a state in which the system main relay R1 is closed to connect the battery B1 and the electric power conversion device 30, the output voltage of the battery B1 is applied to the capacitor C1 included in the electric power conversion device 30, and high-voltage electric charge is stored in the capacitor C1.

For this reason, in a case where the vehicle 1 collides against a collision object, such as another vehicle or an obstacle, it is desirable to quickly discharge the high-voltage residual electric charge stored in the capacitor C1.

Accordingly, the ECU 100 according to this embodiment opens the system main relay R1 to disconnect the battery B1 from the capacitor C1 in a case where the occurrence of a collision of the vehicle 1 is detected by the collision detection sensor 90, and executes control (hereinafter, referred to as "capacitor discharge processing") for operating the inverter 31 to discharge the residual electric charge of the capacitor C1.

As a specific method for capacitor discharge control, several methods are considered. For example, as one method, a case where the inverter 31 is driven such that only a d-shaft current flows in the MG 20 is considered. According to this method, it is possible to make the residual electric charge of the capacitor C1 be consumed using the switching elements of the inverter 31 and a coil of the MG 20 without causing rotational torque in the MG 20. As another method, a case where, in a state in which the MG 20 does not rotate, the switching elements of any arm of the upper and lower arms in an arbitrary phase of the inverter 31 are maintained in an on state, and the switching elements of the other arm are switched is considered. Even in such a method, it is possible to make the residual electric charge of the capacitor C1 be consumed using the switching elements of the inverter 31 and the coil of the MG 20.

As described above, the ECU 100 executes the capacitor discharge control in a case where the occurrence of a collision of the vehicle 1 is detected. However, if the MG 20 continues to rotate during the execution of the capacitor discharge control, a counter electromotive force of the MG 20 continues to be supplied to the capacitor. For this reason, in order to quickly discharge the residual electric charge of the capacitor C1 by the capacitor discharge control, it is desirable to early decrease the MG rotation speed Nm.

Accordingly, the ECU 100 according to this embodiment controls the clutch K2 to early decrease the MG rotation speed Nm before executing the capacitor discharge control in a case where the occurrence of the collision of the vehicle 1 is detected.

Figure 3:
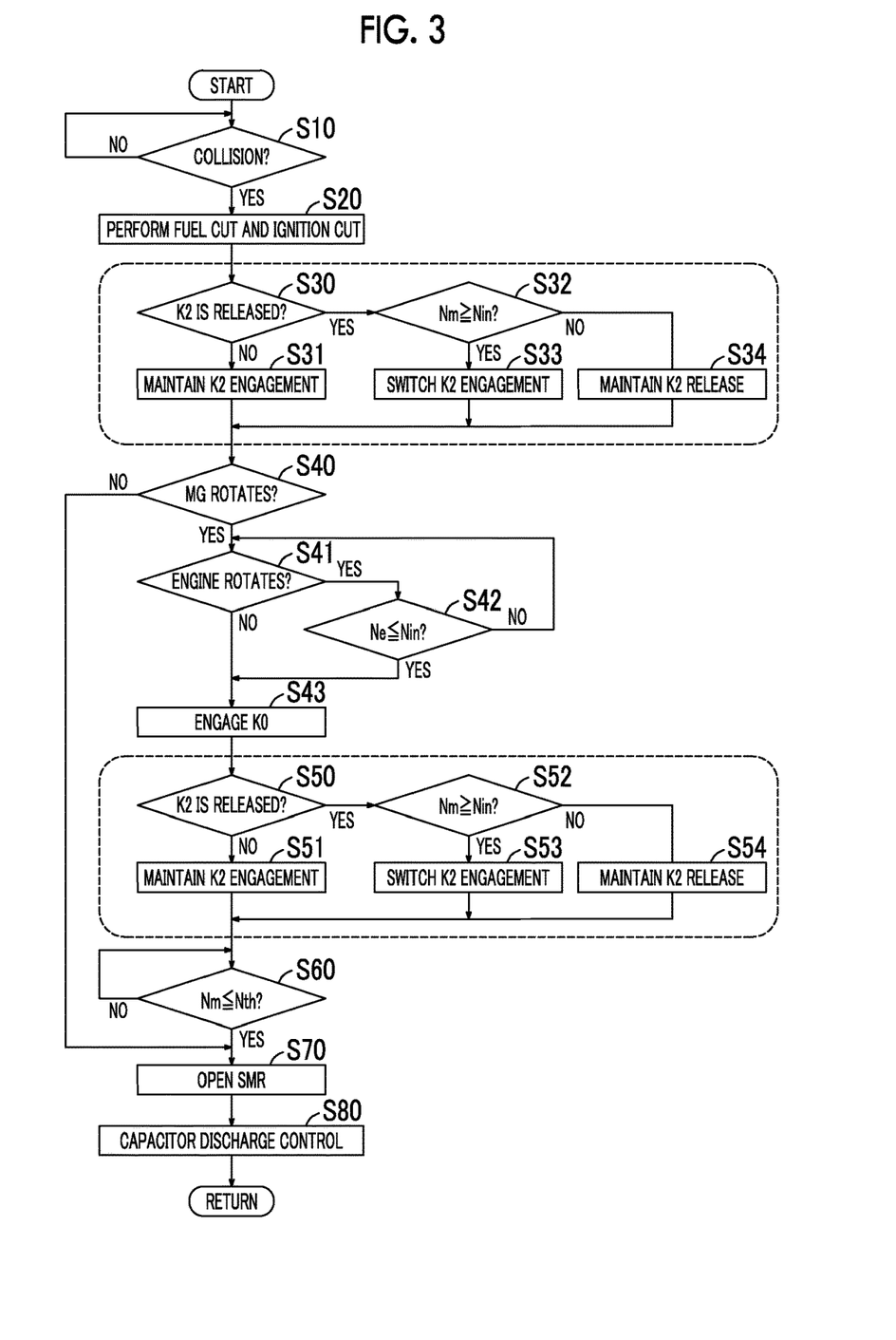
FIG. 3 is a flowchart showing a processing procedure of an electronic control unit (ECU)

FIG. 3 is a flowchart showing a processing procedure which is performed by the ECU 100 when the collision of the vehicle 1 occurs.

In Step (hereinafter, Step is abbreviated as "S") 10, the ECU 100 determines whether or not the occurrence of the collision of the vehicle 1 is detected by the collision detection sensor 90. In a case where the occurrence of the collision of the vehicle 1 is not detected (NO in S10), the ECU 100 returns the process to S10.

In a case where the occurrence of the collision of the vehicle 1 is detected (YES in S10), in S20, the ECU 100 performs fuel cut to stop fuel supply to the engine 10 and ignition cut to stop fuel ignition. With this, since the engine 10 is brought into a state of not outputting combustion torque, the engine rotation speed Ne gradually decreases as long as power from the AT input shaft 41 is not transmitted to the engine 10.

Thereafter, in S30 to S34, the ECU 100 controls the clutch K2 such that the MG rotation speed Nm decreases early. Specifically, in S30, the ECU 100 determines whether or not the clutch K2 is in a release state. In a case where the clutch K2 is already in an engagement state (NO in S30), in S31, the ECU 100 maintains the clutch K2 in the engagement state as it is.

In a case where the clutch K2 is in the release state (YES in S30), in S32, the ECU 100 determines whether or not the MG rotation speed Nm is equal to or higher than the AT input shaft rotation speed Nin. In a case where the MG rotation speed Nm is equal to or higher than the AT input shaft rotation speed Nin (YES in S32), in S33, the ECU 100 switches the clutch K2 from the release state to the engagement state. With this, it is possible to early decrease the rotational energy of the MG 20, and to early decrease the MG rotation speed Nm toward the AT input shaft rotation speed Nin. Hereinafter, control for switching the clutch K2 from the release state to the engagement state in S33 is referred to as "first engagement switching control".

In a case where the MG rotation speed Nm is lower than the AT input shaft rotation speed Nin (NO in S32), in S34, the ECU 100 maintains the clutch K2 in the release state. With this, an unnecessary increase in the MG rotation speed Nm toward the AT input shaft rotation speed Nin due to the engagement of the clutch K2 is suppressed. Hereinafter, control for maintaining the clutch K2 in the release state in S34 is referred to as "release maintenance control".

After the processing of S30 to S34, in S40, the ECU 100 determines whether or not the MG 20 is rotating. That is, it is determined whether or not the absolute value of the MG rotation speed Nm is greater than 0.

In a case where the MG 20 is rotating (YES in S40), in S41, the ECU 100 determines whether or not the engine 10 is rotating. That is, the engine 10 determines whether or not the engine 10 is in a state of still rotating with inertia after the fuel cut and the ignition cut in S20.

In a case where the engine 10 is rotating (YES in S41), in S42, the ECU 100 determines whether or not the engine rotation speed Ne is equal to or lower than the AT input shaft rotation speed Nin. In a case where the engine rotation speed Ne is higher than the AT input shaft rotation speed Nin (NO in S42), the ECU 100 returns the process to S41.

In a case where the engine rotation speed Ne is equal to or lower than the AT input shaft rotation speed Nin (YES in S42), in S43, the ECU 100 brings the clutch K0 into the engagement state. With this, it is possible to early decrease the AT input shaft rotation speed Nin toward the engine rotation speed Ne. For this reason, the AT input shaft rotation speed Nin is promoted to decrease to be lower than the MG rotation speed Nm, and the processing of S53 (the second engagement switching control) described below can be easily executed.

A situation in which it is determined in S42 that the engine rotation speed Ne is equal to or lower than the AT input shaft rotation speed Nin includes not only a case where the clutch K0 is in the release state and the engine rotation speed Ne is lower than the AT input shaft rotation speed Nin, but also a case where the clutch K0 is already in the engagement state and the engine rotation speed Ne coincides with the AT input shaft rotation speed Nin. Accordingly, the processing contents of S43 also include processing for maintaining the clutch K0, which is already in the engagement state, in the engagement state as it is.

After the processing of S43, in S50 to S54, the ECU 100 controls the clutch K2 again such that the MG rotation speed Nm decreases early. The processing of S50 to S54 are respectively the same as the processing of S30 to S34 described above.

That is, in a case where the clutch K2 is already in the engagement state (NO in S50), the ECU 100 maintains the clutch K2 in the engagement state as it is (S51).

In a case where the clutch K2 is in the release state (YES in S50), and the MG rotation speed Nm is equal to or higher than the AT input shaft rotation speed Nin (YES in S52), the ECU 100 switches the clutch K2 from the release state to the engagement state (S53). With this, it is possible to early decrease the MG rotation speed Nm toward the AT input shaft rotation speed Nin. Hereinafter, control for switching the clutch K2 from the release state to the engagement state in S53 after the processing of S43 is referred to as "second engagement switching control".

In a case where the clutch K2 is in the release state (YES in S50), and the MG rotation speed Nm is lower than the AT input shaft rotation speed Nin (NO in S52), the ECU 100 maintains the clutch K2 in the release state (S54).

After the processing of S50 to S54, in S60, the ECU 100 determines whether or not the MG rotation speed Nm is equal to or less than a threshold Nth. This determination is performed in order to confirm that the MG rotation speed Nm sufficiently decreases to a value enabling the start of the above-described capacitor discharge control.

In a case where the MG rotation speed Nm is not equal to or less than the threshold Nth (NO in S60), the ECU 100 returns the process to S60 and waits for the MG rotation speed Nm to be equal to or less than the threshold Nth.

In a case where the MG rotation speed Nm is equal to or less than the threshold Nth (YES in S60), in S70, the ECU 100 opens the system main relay R1, and then, executes the above-described capacitor discharge control in S80.

In a case where it is determined in S40 that the MG 20 is not rotating (NO in S40), that is, in a case whether the rotation of the MG 20 is already stopped, the ECU 100 skips the processing of S41 to S60, opens the system main relay R1 in in S70, and then, executes the above-described capacitor discharge control in S80.

Figure 4:
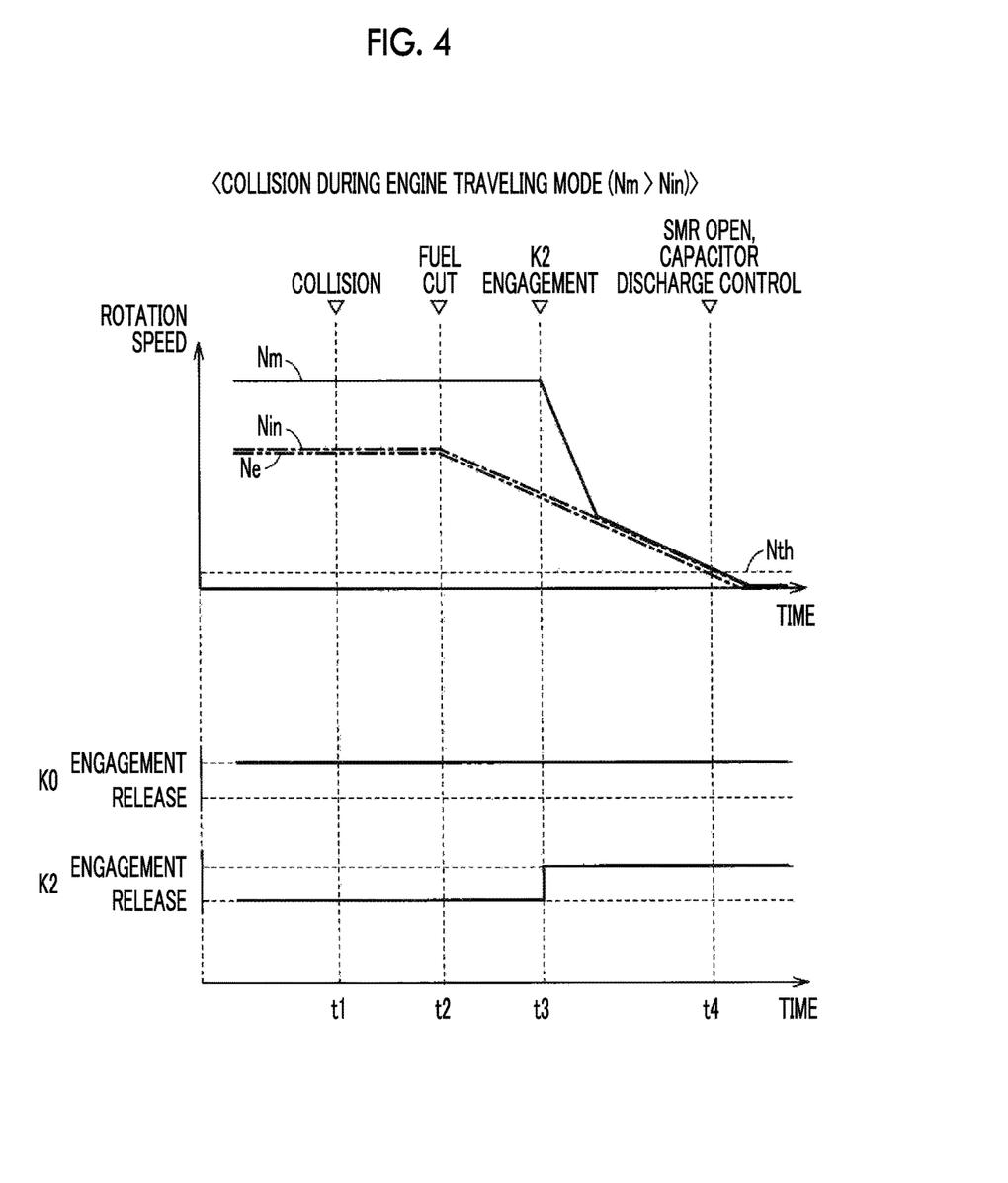
FIG. 4 is a diagram showing an example of change in motor generator (MG) rotation speed Nm in a case where a collision of the vehicle occurs during an engine traveling mode.

FIG. 4 is a diagram showing an example of change in MG rotation speed Nm in a case where a collision of the vehicle 1 occurs during the engine traveling mode. In FIG. 4, the horizontal axis indicates time, and the vertical axis indicates, in order from above, the rotation speeds (MG rotation speed Nm (solid line), AT input shaft rotation speed Nin (one-dot-chain line), engine rotation speed Ne (two-dot-chain line)), the state of the clutch K0, and the state of the clutch K2.

Before time t1, since it is during the engine traveling mode, the clutch K0 is in the engagement state, and the clutch K2 is in the release state. Since the clutch K0 is in the engagement state, the engine rotation speed Ne becomes the same value as the AT input shaft rotation speed Nin. On the other hand, since the clutch K2 is in the release state, the MG rotation speed Nm can have a value different from the AT input shaft rotation speed Nin. FIG. 4 shows an example where the MG rotation speed Nm becomes a value higher than the AT input shaft rotation speed Nin.

If the collision of the vehicle 1 occurs at the time t1, the fuel cut of the engine 10 is performed at subsequent time t2. With this, the engine rotation speed Ne starts to decrease.

At subsequent time t3, if it is determined that the MG rotation speed Nm is higher than the AT input shaft rotation speed Nin, the clutch K2 is switched from the release state to the engagement state. (the first engagement switching control) With this, the MG rotation speed Nm decreases early toward the AT input shaft rotation speed Nin.

If the MG rotation speed Nm decreases to be equal to or less than the threshold Nth at time t4 with a decrease in the MG rotation speed Nm, the system main relay R1 is opened and the capacitor discharge control is started. With this, it is possible to start the capacitor discharge control earlier than a case where the first engagement switching control is not executed. As a result, it is possible to quickly discharge the residual electric charge of the capacitor C1.

Figure 5:
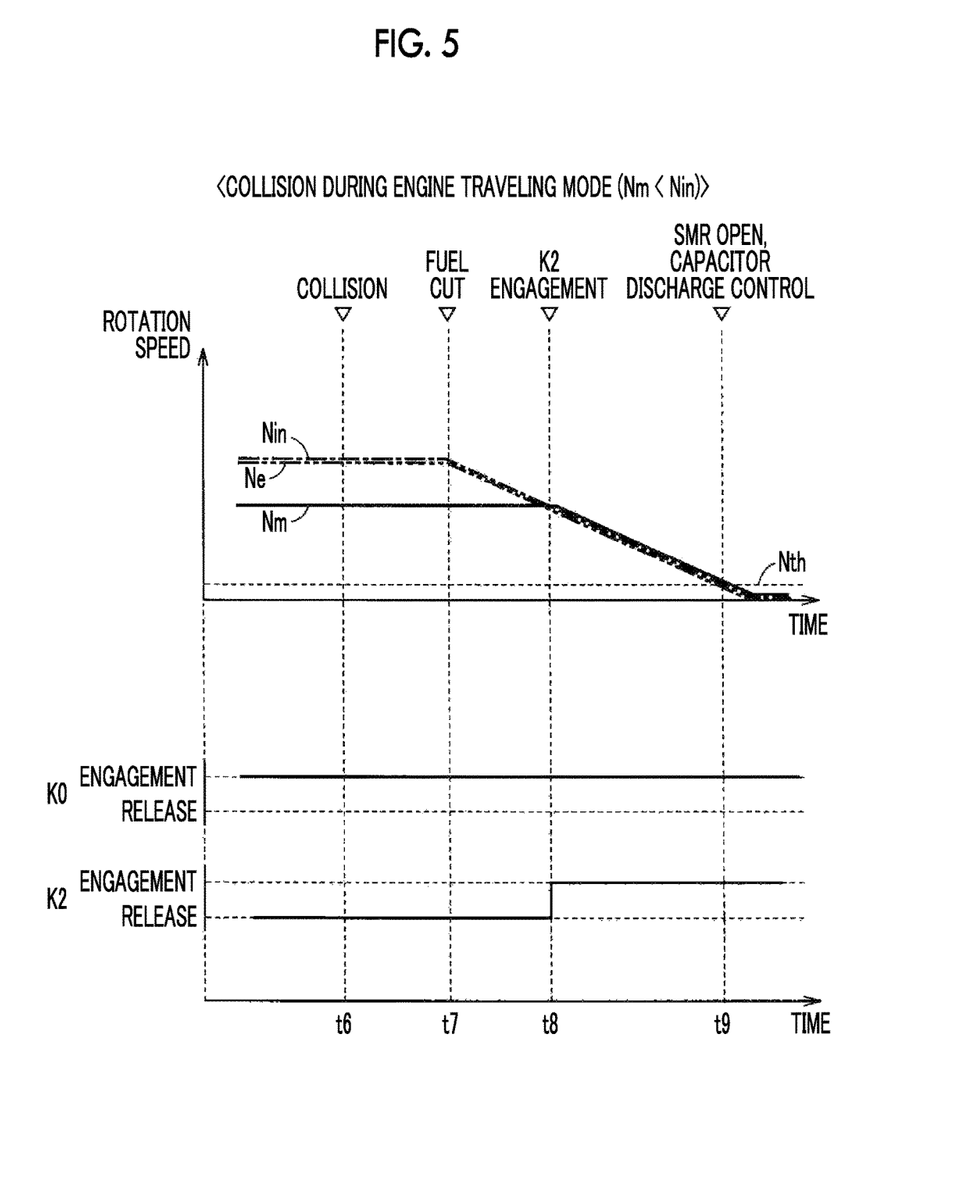
FIG. 5 is a diagram showing an example of change in MG rotation speed Nm in a case where a collision of the vehicle occurs during the engine traveling mode.

FIG. 5 is a diagram showing an example of change in MG rotation speed Nm in a case where a collision of the vehicle 1 occurs during the engine traveling mode in a state where the MG rotation speed Nm is lower than the AT input shaft rotation speed Nin (Nm<Nin). In FIG. 5, like FIG. 4 described above, the horizontal axis indicates time, and the vertical axis indicates, in order from above, the rotation speeds (MG rotation speed Nm (solid line), AT input shaft rotation speed Nin (one-dot-chain line), and engine rotation speed Ne (two-dot-chain line)), the state of the clutch K0, and the state of the clutch K2.

Before time t6, since the clutch K0 is in the engagement state, the engine rotation speed Ne becomes the same value as the AT input shaft rotation speed Nin. On the other hand, the clutch K2 is in the release state, and as described, the MG rotation speed Nm becomes a value lower than the AT input shaft rotation speed Nin.

If a collision of the vehicle 1 occurs at the time t6, the fuel cut of the engine 10 is performed at subsequent time t7. With this, the engine rotation speed Ne starts to decrease.

At the time t7, since the MG rotation speed Nm is lower than the AT input shaft rotation speed Nin, the clutch K2 is maintained in the release state without being switched to the engagement state. (the release maintenance control) With this, an unnecessary increase in the MG rotation speed Nm toward the AT input shaft rotation speed Nin due to the engagement of the clutch K2 is suppressed.

At the time t7, since the MG 20 and the engine 10 are rotating (YES in S40 and YES in S41), and the engine rotation speed Ne and the AT input shaft rotation speed Nin have the same value (YES in S42), the clutch K0 is maintained in the engagement state as it is (S43).

At subsequent time t8, if it is determined that the AT input shaft rotation speed Nin decreases to the MG rotation speed Nm, the clutch K2 is switched from the release state to the engagement state. (the second engagement switching control) With this, the engine rotation speed Ne, and the AT input shaft rotation speed Nin, and the MG rotation speed Nm become the same value.

If the MG rotation speed Nm decreases to be equal to or less than the threshold Nth at subsequent time t9, the system main relay R1 is opened and the capacitor discharge control is started.

Figure 6:
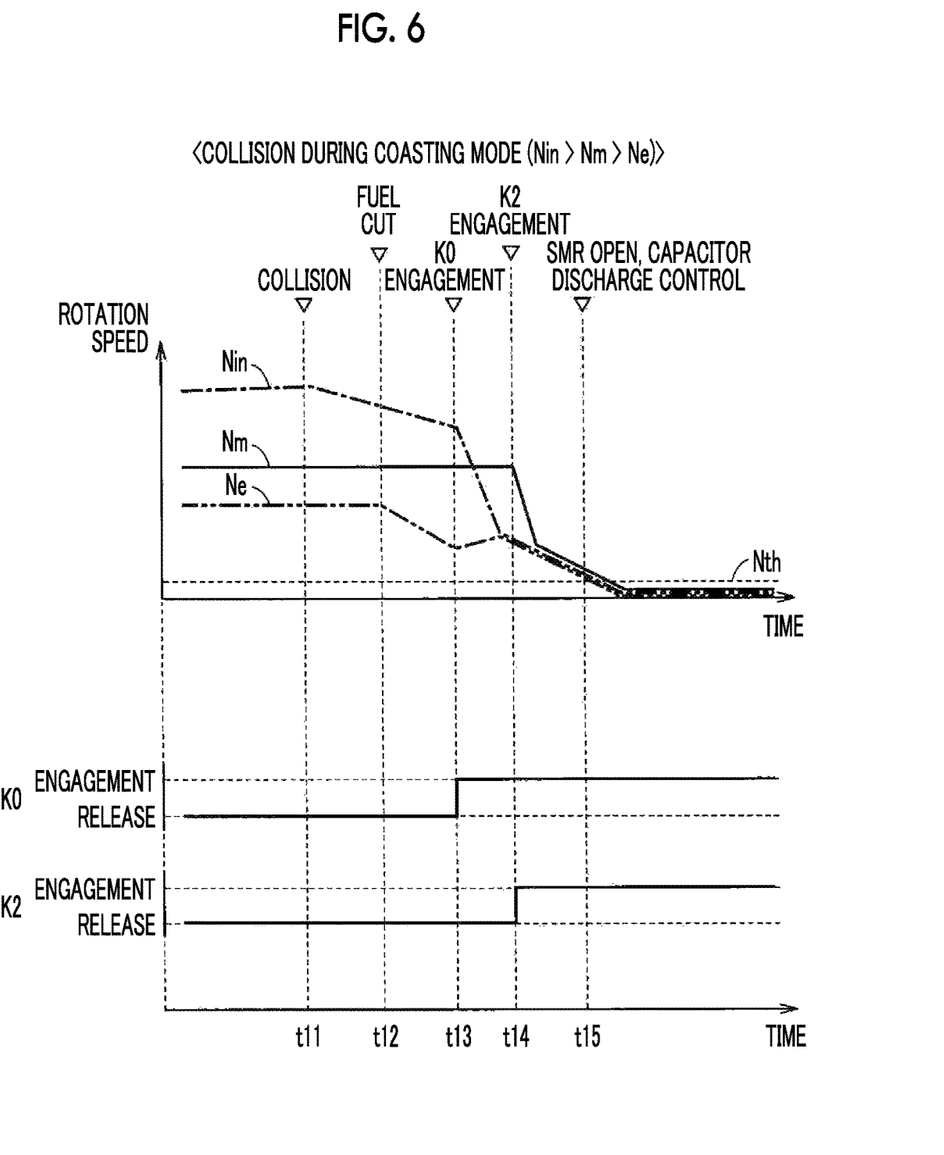
FIG. 6 is a diagram showing an example of change in MG rotation speed Nm in a case where a collision of the vehicle occurs during a coasting mode.

FIG. 6 is a diagram showing an example of change in MG rotation speed Nm in a case where a collision of the vehicle 1 occurs during the coasting mode. In FIG. 6, like FIG. 4 described above, the horizontal axis indicates time, and the vertical axis indicates, in order from above, the rotation speeds (MG rotation speed Nm (solid line), AT input shaft rotation speed Nin (one-dot-chain line), and engine rotation speed Ne (two-dot-chain line)), the state of the clutch K0, and the state of the clutch K2.

Before time t11, since it is during the coasting mode, the clutch K0 is in the release state, and the clutch K2 is also in the release state. For this reason, the AT input shaft rotation speed Nin, the MG rotation speed Nm, and the engine rotation speed Ne can have different values. FIG. 6 shows an example where the AT input shaft rotation speed Nin, the MG rotation speed Nm, and the engine rotation speed Ne have values which become higher in this order.

If a collision of the vehicle 1 occurs at the time t11, the AT input shaft rotation speed Nin starts to decrease due to the influence of the collision. If the fuel cut of the engine 10 is performed at subsequent time t12, the engine rotation speed Ne starts to decrease. At this time, since the MG rotation speed Nm is lower than the AT input shaft rotation speed Nin, the clutch K2 is maintained in the release state without being switched to the engagement state. With this, an unnecessary increase in the MG rotation speed Nm toward the AT input shaft rotation speed Nin due to the engagement of the clutch K2 is suppressed.

At subsequent time t13, if it is determined that the engine rotation speed Ne is equal to or lower than the AT input shaft rotation speed Nin, the clutch K0 is switched from the release state to the engagement state. With this, it is possible to early decrease the AT input shaft rotation speed Nin toward the engine rotation speed Ne. For this reason, the AT input shaft rotation speed Nin is promoted to decrease to be lower than the MG rotation speed Nm.

If it is determined at time t14 that the AT input shaft rotation speed Nin decreases to be lower than the MG rotation speed Nm, the clutch K2 is switched from the release state to the engagement state. With this, it is possible to early decrease the MG rotation speed Nm toward the AT input shaft rotation speed Nin.

If the MG rotation speed Nm decreases to be less than the threshold Nth with a decrease in the MG rotation speed Nm at time t15, the system main relay R1 is opened and the capacitor discharge control is started. With this, it is possible to start the capacitor discharge control earlier than a case where the second engagement switching control is not executed. As a result, it is possible to quickly discharge the residual electric charge of the capacitor C1.

Figure 7:
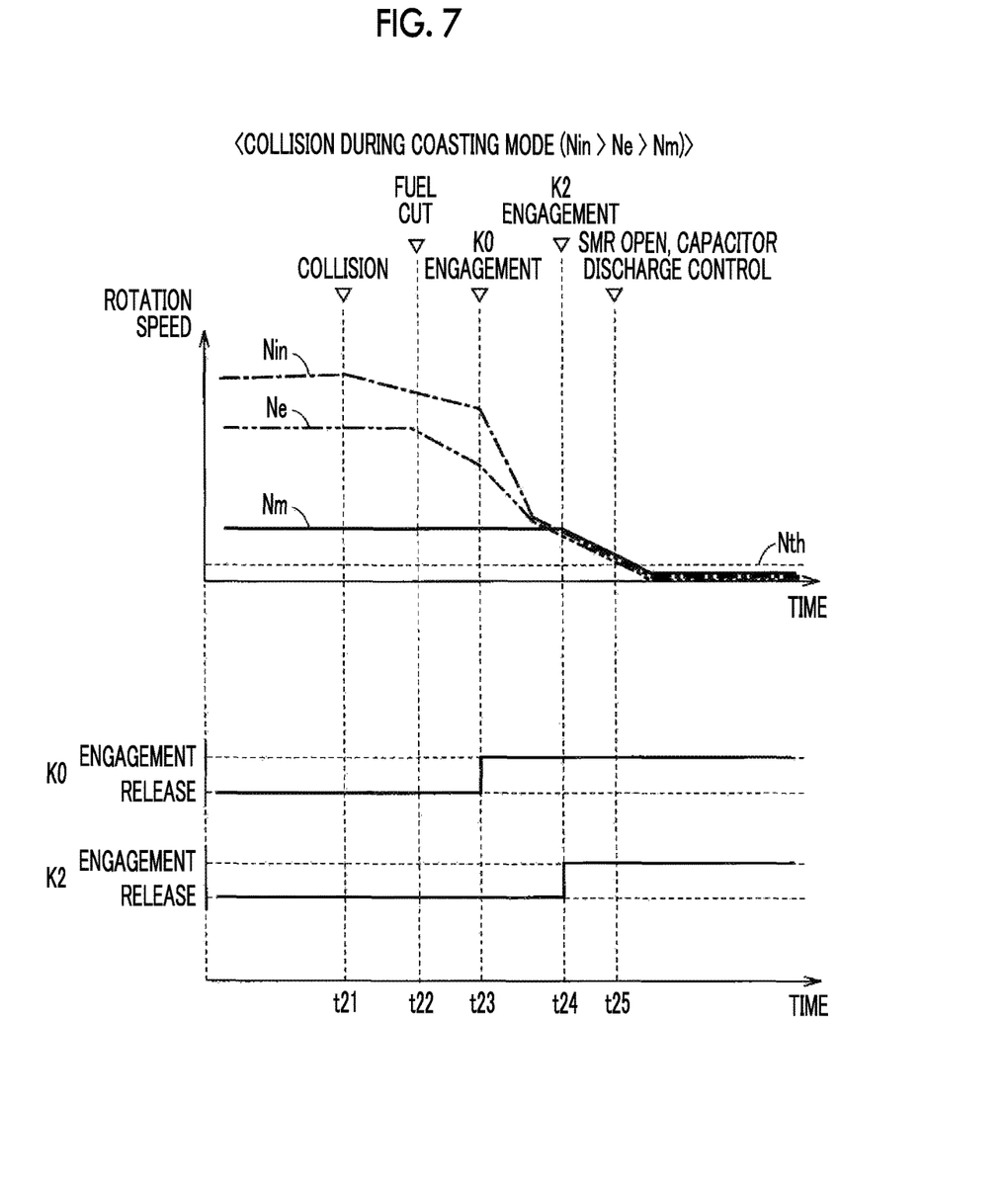
FIG. 7 is a diagram showing an example of change in MG rotation speed Nm in a case where a collision of the vehicle occurs during the coasting mode.

FIG. 7 is a diagram showing an example of change in MG rotation speed Nm in a case where a collision of the vehicle 1 occurs during the coasting mode in a state where the AT input shaft rotation speed Nin, the engine rotation speed Ne, and the MG rotation speed Nm have values which become higher in this order. In FIG. 7, like FIG. 6 described above, the horizontal axis indicates time, and the vertical axis indicates the rotation speeds (MG rotation speed Nm (solid line), AT input shaft rotation speed Nin (one-dot-chain line), and engine rotation speed Ne(two-dot-chain line)), the state of the clutch K0, and the state of the clutch K2.

If a collision of the vehicle 1 occurs at time t21, the AT input shaft rotation speed Nin starts to decrease due to the influence of the collision. If the fuel cut of the engine 10 is performed at subsequent time t22, the engine rotation speed Ne starts to decrease. At this time, since the MG rotation speed Nm is lower than the AT input shaft rotation speed Nin, the clutch K2 is maintained in the release state without being switched to the engagement state. With this, an unnecessary increase in the MG rotation speed Nm toward the AT input shaft rotation speed Nin due to the engagement of the clutch K2 is suppressed.

At subsequent time t23, if it is determined that the engine rotation speed Ne is equal to or lower than the AT input shaft rotation speed Nin, the clutch K0 is switched from the release state to the engagement state. With this, it is possible to early decrease the AT input shaft rotation speed Nin toward the engine rotation speed Ne. For this reason, the AT input shaft rotation speed Nin is promoted to decrease toward the MG rotation speed Nm.

If it is determined at time t24 that the AT input shaft rotation speed Nin decreases to the MG rotation speed Nm, the clutch K2 is switched from the release state to the engagement state. (the second engagement switching control) If the MG rotation speed Nm decreases to be equal to or less than the threshold Nth at subsequent time t25, the system main relay R1 is opened and the capacitor discharge control is started.

As described above, in a case where the occurrence of the collision of the vehicle 1 is detected, and the clutch K2 is in the release state, the ECU 100 according to this embodiment engages the clutch K0 only in a case where the MG rotation speed Nm is equal to or higher than the AT input shaft rotation speed Nin. That is, in a case where the MG rotation speed Nm is equal to or higher than the rotation speed of the input shaft, the ECU 100 switches the clutch K2 to the engagement state. (the first engagement switching control) With this, it is possible to early decrease the rotational energy of the MG 20, and to early decrease the MG rotation speed Nm toward the AT input shaft rotation speed Nin. In a case where the MG rotation speed Nm is lower than the AT input shaft rotation speed Nin, the ECU 100 maintains the clutch K2 in the release state. (the release maintain control) With this, an unnecessary increase in the MG rotation speed Nm toward the AT input shaft rotation speed Nin due to the engagement of the clutch K2 is suppressed. As a result, it is possible to early decrease the MG rotation speed Nm after the collision of the vehicle 1 occurs.

Even in a case where the clutch K2 is maintained in the release state by the release maintenance control after the vehicle collision, the ECU 100 according to this embodiment brings the clutch K0 into the engagement state in a case where the AT input shaft rotation speed Nin is equal to or higher than the engine rotation speed Ne. With this, it is possible to early decrease the AT input shaft rotation speed Nin toward the engine rotation speed Ne. For this reason, it is possible to promote the AT input shaft rotation speed Nin to decrease to be lower than the MG rotation speed Nm. Then, in a case where the AT input shaft rotation speed Nin decreases to be equal to or lower than the MG rotation speed Nm due to the engagement of the clutch K0, the ECU 100 switches the clutch K2 to the engagement state. With this, it is possible to early decrease the rotation speed of the rotating electric machine toward the rotation speed of the input shaft.

While a converter is not included in the electric power conversion device 30 according to the above-described embodiment, a converter which performs voltage conversion between the battery B1 and the inverter 31 may be added to the electric power conversion device 30. In a case of adding a converter, the converter may be subjected to the capacitor discharge control. That is, the converter is operated so as to discharge the residual electric charge of the capacitor C1.

A discharge resistor which is connected in parallel with the capacitor C1 may be added to the electric power conversion device 30, and the capacitor discharge control may be performed using the discharge resistor. That is, the inverter 31 or the above-described converter may be operated such that the residual electric charge of the capacitor C1 is consumed by the discharge resistor.

The subject of the capacitor discharge control is not necessarily limited to the inverter 31 or the above-described converter. For example, a dedicated circuit for discharging the residual electric charge of the capacitor, and the dedicated circuit may be subjected to the capacitor discharge control.

It should be considered that the embodiments disclosed herein are merely exemplary in all aspects, and not restrictive. The scope of the disclosure is defined by the appended claims, not the above description, and is intended to include all changes or modifications within the range of the claims and equivalents thereof.

What is claimed is:

1. A control device for a vehicle, the vehicle including
   an engine,
   a rotating electric machine, the vehicle configured to travel using power of at least one of the engine and the rotating electric machine,
   an automatic transmission including an input shaft connected to the engine and the rotating electric machine,
   a collision detection sensor configured to detect whether or not a collision of the vehicle occurs, and
   a first clutch provided between the rotating electric machine and the input shaft, the first clutch being configured to switch a connection state of the rotating electric machine and the input shaft between an engagement state and a release state,
   the control device comprising
   an electronic control unit configured to
   (i) execute a first engagement switching control, the first engagement switching control being control for switching the first clutch from the release state to the engagement state when the occurrence of the collision of the vehicle is detected by the collision detection sensor, the first clutch is in the release state, and a rotation speed of the rotating electric machine is equal to or higher than a rotation speed of the input shaft, and
   (ii) execute a release maintenance control, the release maintenance control being control for maintaining the first clutch in the release state when the occurrence of the collision of the vehicle is detected by the collision detection sensor, the first clutch is in the release state, and the rotation speed of the rotating electric machine is lower than the rotation speed of the input shaft.

2. The control device according to claim 1,
   the vehicle further including a second clutch provided between the engine and the input shaft, the second clutch being configured to switch a connection state of the engine and the input shaft between the engagement state and the release state, wherein
   the electronic control unit is configured to
   (i) bring the second clutch into the engagement state when the rotation speed of the input shaft is equal to or higher than a rotation speed of the engine during the execution of the release maintenance control, and
   (ii) execute a second engagement switching control, the second engagement switching control being control for switching the first clutch from the release state to the engagement state when the rotation speed of the input shaft decreases to be equal to or lower than the rotation speed of the rotating electric machine after the second clutch is brought into the engagement state.

3. A control method for a vehicle, the vehicle including
an engine,
a rotating electric machine, the vehicle configured to travel using power of at least one of the engine or the rotating electric machine,
a automatic transmission including an input shaft connected to the engine and the rotating electric machine,
a collision detection sensor configured to detect whether or not a collision of the vehicle occurs,
a first clutch provided between the rotating electric machine and the input shaft, the first clutch being configured to switch a connection state of the rotating electric machine and the input shaft between an engagement state and a release state,
an electronic control unit,
the control method comprising
(i) executing a first engagement switching control by the electronic control unit, the first engagement switching control being control for switching the first clutch from the release state to the engagement state when the occurrence of the collision of the vehicle is detected by the collision detection sensor, the first clutch is in the release state, and a rotation speed of the rotating electric machine is equal to or higher than a rotation speed of the input shaft, and (ii) executing a release maintenance control by the electronic control unit, the release maintenance control being control for maintaining the first clutch in the release state when the occurrence of the collision of the vehicle is detected by the collision detection sensor, the first clutch is in the release state, and the rotation speed of the rotating electric machine is lower than the rotation speed of the input shaft.

4. The control device according to claim 1, wherein the electronic control unit is further configured to maintain the clutch in the engagement state in a case where the clutch is already in the engagement state when the occurrence of the collision of the vehicle is detected.

* * * * *